E. B. REESE.
AUTOMATIC ELECTRIC GENERATING SYSTEM.
APPLICATION FILED AUG. 14, 1916.
1,360,246.
Patented Nov. 23, 1920.
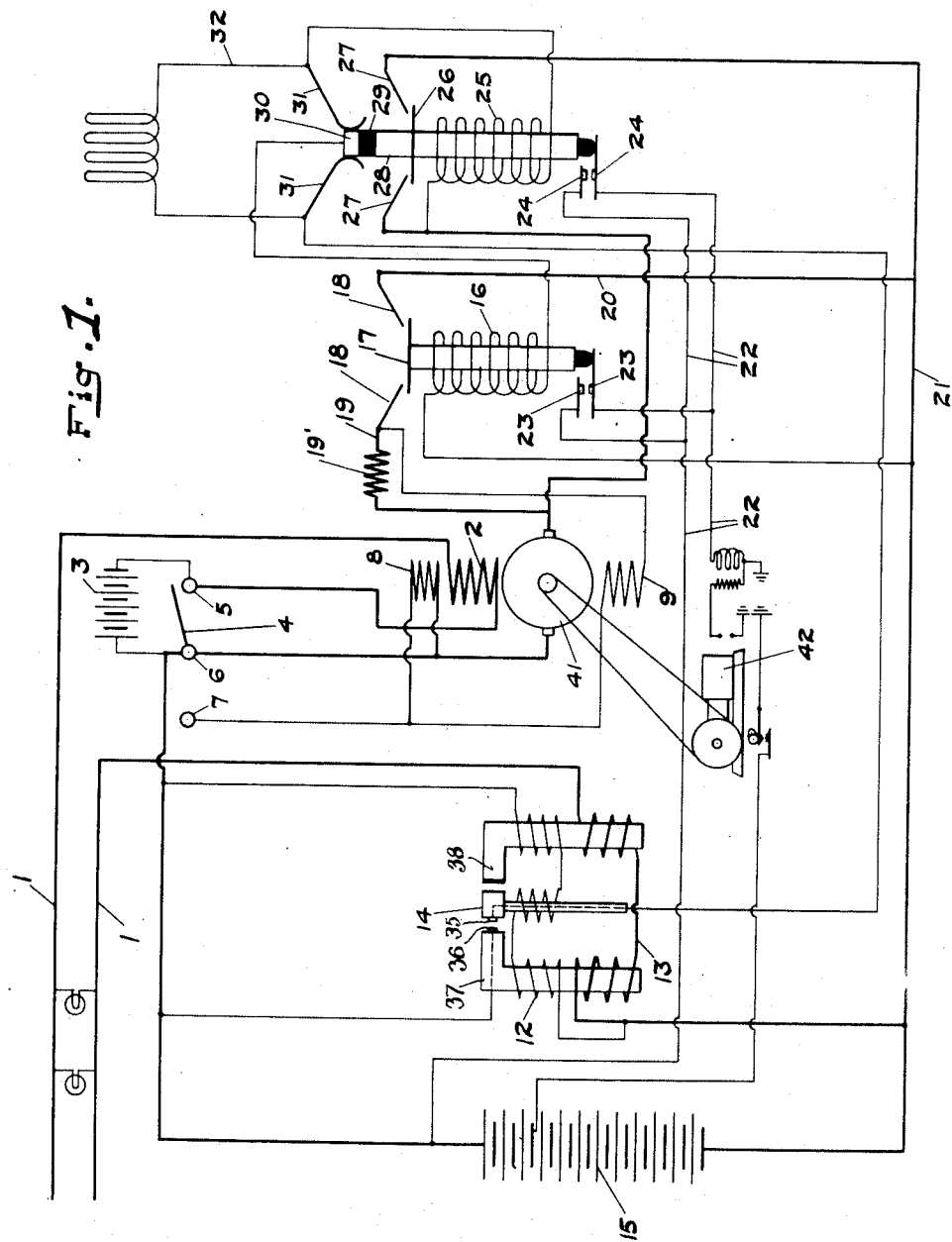
INVENTOR
Edward B. Reese
BY
ATTORNEYS.

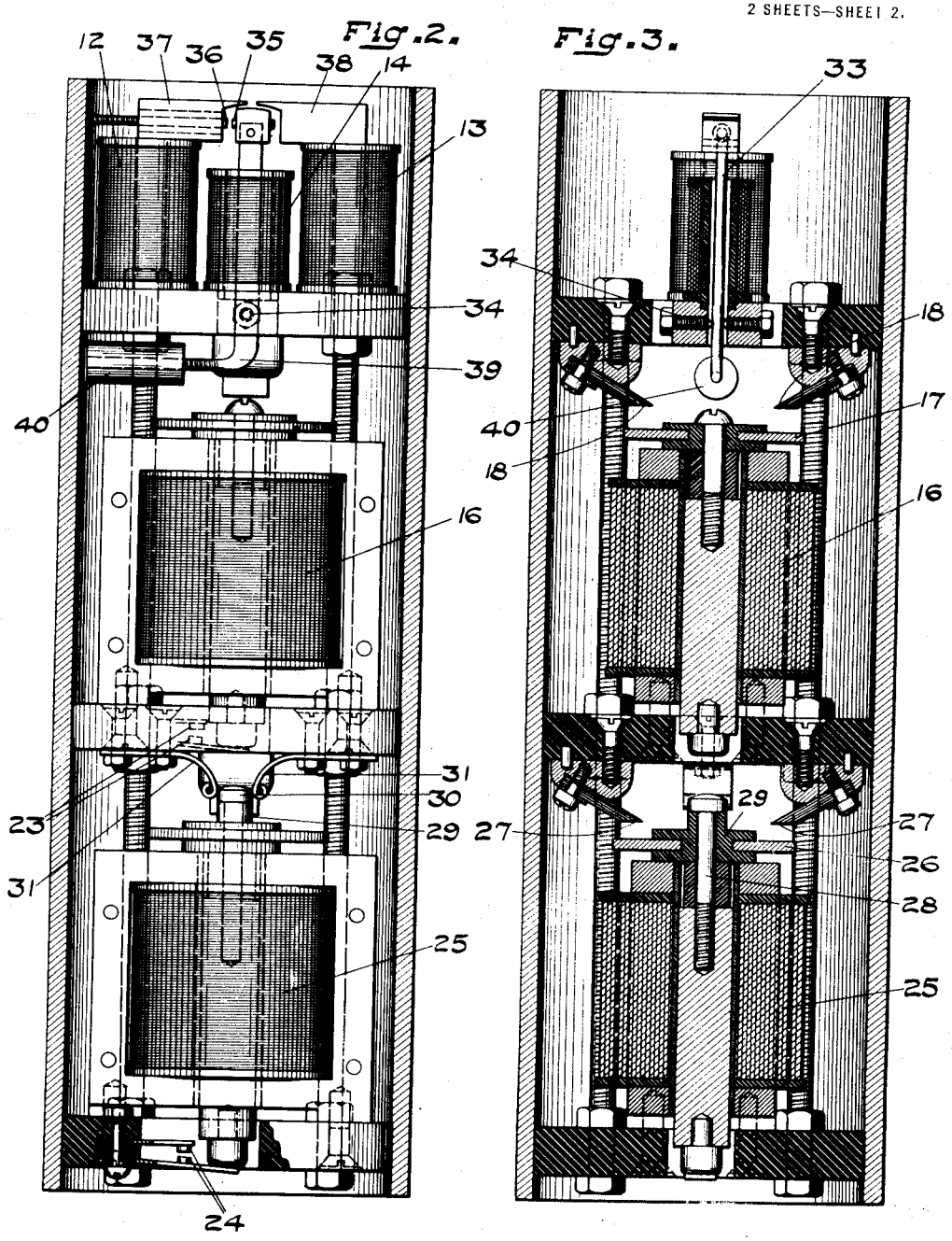

UNITED STATES PATENT OFFICE.

EDWARD B. REESE, OF INDIANAPOLIS, INDIANA, ASSIGNOR TO SWARTZ ELECTRIC COMPANY, OF INDIANAPOLIS, INDIANA, A CORPORATION OF INDIANA.

AUTOMATIC ELECTRIC GENERATING SYSTEM.

1,360,246.  Specification of Letters Patent.  Patented Nov. 23, 1920.

Application filed August 14, 1916. Serial No. 114,907.

*To all whom it may concern:*

Be it known that I, EDWARD B. REESE, a citizen of the United States, residing at Indianapolis, Marion county, and State of Indiana, have invented and discovered certain new and useful Improvements in Automatic Electric Generating Systems, of which the following is a specification.

My invention relates to automatic electric control systems and its object is to provide a system which shall be operable in conjunction with two or more sources of electrical energy, each of which may be either a source of primary energy or secondary energy, and which are preferably of different capacities, for the purpose of automatically adding in or cutting out one or more of such sources of energy, particularly in connection with an arrangement in which one of the sources is a storage battery and the other or others a generator or generators, and which system is operable to automatically establish a flow of current from an additional source upon either a predetermined increase of current demand in the line or upon a predetermined decrease in the voltage of another source or by the conjoined effect of such factors, which change of current supply is effected by means of a switch control element which is a constant of known value in voltage and which is independent of the relation between current demand and source unit, and therefore serves, when a battery is used as one of the units, to cut out the current demand on the battery or reinforce the supply to the line before an undesirable loss of voltage therein can occur, the system also operating to cut out the additional unit and supply the current from the remaining source or sources upon a predetermined decrease in current demand in the line.

The invention also contemplates the utilization of such switch in a circuit which automatically excites and starts motor means for a prime mover which motor means are converted into a generator driven by the prime mover, upon a predetermined speed of said prime mover.

With these objects and others in view, my invention is embodied in preferable form in the arrangement hereinafter described and illustrated in the accompanying drawings.

In the drawing Figure 1 is a diagrammatic view of the circuits,

Fig. 2 is a diametrical sectional view of a switch structure,

Fig. 3 is a diametrical view on a plane at right angles to the plane at Fig. 2.

Referring to the drawings, the invention is shown as applied to a system having a line to which current is supplied for lighting or power purposes and having a storage battery adapted to supply the current to the line when the current demand of the latter is at or below a predetermined point and having a generator set consisting of a motor-dynamo driven by a prime mover consisting preferably of an internal combustion engine, and which generator set is automatically thrown into circuit with the line when the current demand on the latter exceeds said predetermined point.

Referring to the circuit as indicated in Fig. 1, 1 is the load line; 2 the series winding of the generator and 3 a resistance consisting preferably of counter electromotive force cells arranged in the line. 4 is a single pole double throw switch adapted to normally connect the terminals 5 and 6 to short circuit the resistance 3 and also adapted to connect the terminals 6 and 7 when it is desired to give a refreshing charge from the generator to the battery, and which latter connection serves to short circuit a shunt field resistance 8 across the line and increase the strength of the shunt field 9, said switch becoming either a part of the generator shunt circuit or the main line circuit respectively. The other branch of the line leads through a differential series winding 12 of a master switch 14 and through a shunt winding 13 thereof, and to the terminal of said master switch which consists of a current and voltage relay, said windings and terminal being also in circuit with a storage battery 15 which constitutes one of the sources of electrical energy.

A shunt wound solenoid motor switch 16 has a movable contact 17 adapted to open and close the circuit through fixed contacts 18, one of which leads by conductor 19 through the generator armature and a starting resistance 19′ as one circuit and through the shunt field 9 of the generator as the other circuit and the other of which leads by conductor 20 to the supply line 21. This motor switch controls the starting of the generator to effect the starting of the prime mover and controls the ignition circuit 22 for the prime mover, the latter control being effected through spring contacts 23.

One contact 23 of the ignition circuit connects with one of a pair of spring contacts 24, the circuit through which is made or broken by the movement of a core of a shunt wound solenoid generator switch 25. These two sets of contacts 23 and 24 are in parallel and each set controls the making and breaking of the ignition circuit. The core of the generator switch 25 carries a movable contact 26 at its upper end adapted to engage the fixed contacts 27 connecting to the generator and battery respectively. This core also carries a circuit closing and interrupting member 28 having a fibrous non-conducting base portion 29 and an upper conducting contact portion 30, which member is adapted to make and break the circuit between the spring contacts 31 which controls an auxiliary circuit 32 by short circuiting the same or connecting it with the main circuit. This auxiliary circuit controls a magnetic engine compression relief mechanism which, however, forms no part of the invention of the present application either in respect to its construction or as a part of the general system.

Referring to Figs. 2 and 3, which show the structure of the switch, the master switch 14 consists of a polarized relay, the core 33 of which is pivoted at 34 and carries at its upper end a contact 35 adapted to engage the contact 36, which connects to the means which establishes the circuit from the generator to the line. The core 33 is movable between the pole pieces 37 and 38, the former pole piece carrying the contact 36 and which pieces are respectively series wound and shunt wound. The core member 33 constitutes a swinging switch arm in the form of a lever, the lower arm 39 of which is provided with a block 40 of a known weight, or a similar element such as a spring, adapted to exert a constant force on the end of the lever arm. This weight or equivalent mechanical resistance member is adapted to balance the force of a certain voltage. Thus, for instance, if the capacity of the battery is 32 volts, the weight is preferably adapted to balance an electromotive force of 27 volts. When the voltage of this battery is decreased below said minimum amount, the weight on the switch arm will be under-balanced and said arm will be moved by the weight and carried against the contact 36. Similarly, when the voltage is built up in the battery and the current demand on the line is proportionately lessened, the electromotive force from the battery will overbalance the force of gravity due to the weight and the switch arm will be drawn against the other pole piece 38. The weight thus constitutes a control element for the master switch which is a constant and which is over-balanced and under-balanced by opposing variable electromotive forces. It will be seen that the master switch includes a current and voltage winding and is series and shunt wound and the generator switch and motor switch are straight shunt wound, as heretofore described, and their contacts and movable parts are shown in Figs. 2 and 3.

The dynamo electric machine which acts as a motor or as a generator is indicated by 41, and 42 is the prime mover consisting preferably of an internal combustion engine.

Assuming that the single pole double throw switch 4 has been thrown so as to connect the terminals 5 and 6, and with a current demand on the load line below a predetermined point, the current will be supplied from the battery and the contact 35 of the arm of the master switch will bear against the pole piece 38. When the current demand on the line cuts the voltage of the battery down to a certain point predetermined by the relation between the constant control element 40 and the decrease in voltage or when the current passes through the differential series winding in sufficient quantity to decrease the electromagnetic force of the main poles of the relay, the weight of the said block or element 40 will overcome the magnetic force induced by the shunt winding and the switch will be automatically thrown so as to carry its contact 35 into engagement with the contact 36, thereby energizing the coil 16. The shunt winding of the said motor switch 16 will cause the armature or core of the solenoid thereof to be raised, exciting the field of the generator and the armature through the starter resistance so as to cause the generator to run as a motor and at the same time, establishing an ignition circuit by permitting the spring contacts 23 to close, the compression relief circuit being short circuited through the conductor 30 so that the engine will partly exhaust through the relief means. When the engine attains sufficient speed to over-run the motor, the latter becomes a generator and the current reverses and the core of the solenoid of the generator switch 25 is lifted through its shunt winding, throwing in the compression relief circuit by breaking the short circuit thereof by means of non-conductor 29 and establishing the ignition circuit through the contacts 24, whereupon the generator will carry the load on the line and the current therefrom will also flow through the battery, recharging the latter. This action will continue until the demand for current on the line drops below a predetermined point or the current is of correct voltage and amperage through the series winding to operate the master switch, whereupon the voltage controlled shunt winding of the master switch overcomes the weakened magnetic force of the series winding thereof and the switch arm of the master switch is moved out of contact with the contact 36 thus opening the line to the generator set exciting coils and permitting the core of the solenoid 25 to drop so as to break the ignition circuit at the contacts 24 and thus stop the engine, also opening the compression relief circuit. Thus it will be seen that below the said predetermined current demand on the load line, current to the lines is supplied from the storage battery alone and above said demand the current will be supplied from the generator set. When the generator is supplying current, the storage battery floats in the line, and, according to the demand in the line, is being recharged, is balanced or is discharging current to the line parallel to the flow from the generator.

The master switch thus affords means whereby a constant control element of a given force adapted to balance a given voltage in the battery operates automatically to shift the current supply from the battery to the generator when said constant is underbalanced, thus effecting the change of current supply by means independent of the two variable components, namely the current and voltage, and thereby enables the additional energy unit to be thrown into the line circuit before the voltage of the battery or other unit becomes exhausted to an undesirable extent.

It is clear that such master switch may be applied to a system in which the plurality of sources of electrical energy consists either of primary or secondary sources or both. The master switch *per se* is described and claimed in my co-pending application No. 114,908 of even date herewith, which has matured into Patent No. 1,332,574, Mar. 2, 1920.

Having thus described my invention, what I claim is:

1. An automatic electric generating system comprising a prime mover, a plurality of sources of electrical energy, including a battery and dynamo electric machine, a load line, a polarized series and shunt wound relay master switch element, a solenoid motor switch, a solenoid generator switch, said latter switches having electrical connection with said master switch.

2. An automatic electric generating system comprising a prime mover, a plurality of sources of electrical energy, including a battery and dynamo electric machine, a load line, a polarized series and shunt wound relay master switch element, a solenoid motor switch, a solenoid generator switch, said latter switches having electrical connection with said master switch, an ignition circuit adapted to be closed independently by each of said latter switches, said dynamo electric machine being operatively connected with said switches.

3. An automatic electric generating system comprising a prime mover, a plurality of sources of electrical energy, including a battery and dynamo electric machine, a load line, a polarized series and shunt wound relay master switch element, a solenoid motor switch, a solenoid generator switch, said latter switches having electrical connection with said master switch, an ignition circuit adapted to be closed independently by each of said latter switches, said dynamo electric machine being operatively connected with said switches, said master switch being so arranged that when the current demand on the line reaches a predetermined point, or the voltage of the battery decreases below a predetermined point, it automatically causes the prime mover to be actuated.

4. An automatic electric generating system comprising a prime mover, a plurality of sources of electrical energy, including a battery and dynamo electric machine, a load line, a polarized series and shunt wound relay master switch element, a solenoid motor switch, a solenoid generator switch, said latter switches having electrical connection with said master switch, an ignition circuit adapted to be closed independently by each of said latter switches, said dynamo electric machine being operatively connected with said switches, said master switch being so arranged that when the current demand on the line reaches a predetermined point, or the voltage of the battery decreases below a predetermined point, it automatically causes the prime mover to be actuated, a mechanical constant control element being attached to said master switch and being adapted to make certain the automatic actuation of said master switch upon said changes in current demand or voltage.

5. An automatic electric generating system comprising a prime mover, a plurality of sources of electrical energy, including a battery and dynamo electric machine, a load line, a polarized series and shunt wound relay master switch element, a solenoid motor switch, a solenoid generator switch, said latter switches having electrical connection with said master switch, an ignition circuit adapted to be closed independently by each of said latter switches, said dynamo electric machine being operatively connected with said switches, said master switch being so arranged that when the current demand on the line reaches a predetermined point, or the voltage of the battery decreases below a predetermined point, it automatically causes the prime mover to be actuated, a mechanical constant control element being attached to said master switch and being adapted to make certain the automatic actuation of said master switch upon said changes in current demand or voltage, the actuation of said motor switch being controlled by said master switch.

6. An automatic electric generating system comprising a prime mover, a plurality of sources of electrical energy, including a battery and dynamo electric machine, a load line, a polarized series and shunt wound relay master switch element, a solenoid motor switch, a solenoid generator switch, said latter switches having electrical connection with said master switch, an ignition circuit adapted to be closed independently by each of said latter switches, said dynamo electric machine being operatively connected with said switches, said master switch being so arranged that when the current demand on the line reaches a predetermined point, or the voltage of the battery decreases below a predetermined point, it automatically causes the prime mover to be actuated, a mechanical constant control element being attached to said master switch and being adapted to make certain the automatic actuation of said master switch upon said changes in current demand of voltage, the actuation of said motor switch being controlled by said master switch, said generator switch being adapted to be actuated when said dynamo electric machine operates as a generator.

7. An automatic electric generating system comprising a prime mover, a plurality of sources of electrical energy, including a battery and dynamo electric machine, a load line, a polarized series and shunt wound relay master switch element, a solenoid motor switch, a solenoid generator switch said latter switches having electrical connection with said master switch, an ignition circuit adapted to be closed independently by each of said latter switches, said dynamo electric machine being operatively connected with said switches, said master switch being so arranged that when the current demand on the line reaches a predetermined point, or the voltage of the battery decreases below a predetermined point it automatically causes the prime mover to be actuated, a mechanical constant control element being attached to said master switch and being adapted to make certain the automatic actuation of said master switch upon said changes in current demand or voltage, the actuation of said motor switch being controlled by said master switch, said generator switch being adapted to be actuated when said dynamo electric machine operates as a generator, an electro-magnetic element forming part of said master switch and adapted to actuate the same.

In witness whereof, I have hereunto set my hand and seal at Indianapolis, Indiana, this 26th day of June, A. D. nineteen hundred and sixteen.

EDWARD B. REESE. [L. S.]

Witnesses:
A. C. RICE,
H. P. DOOLITTLE.